United States Patent Office 3,458,598
Patented July 29, 1969

3,458,598
PROCESS OF PREPARING BLOCK COPOLYMERS OF POLYOLEFINES AND POLAR VINYL MONOMERS
William J. Craven, Passaic, N.J., assignor, by mesne assignments, to Dart Industries, Inc., a corporation of Delaware
No Drawing. Filed Dec. 8, 1966, Ser. No. 600,039
Int. Cl. C08f 1/56, 15/40, 19/02
U.S. Cl. 260—877                           16 Claims

ABSTRACT OF THE DISCLOSURE

Block copolymers of olefines such as propylene and polar monomers such as acrylonitrile, vinyl pyridine etc. are prepared by forming a mixture of preformed polymeric olefin and organo metallic "Ziegler" type catalysts, treating said mixture with (1) a nitrogenous gas such as ammonia and (2) oxygen, and subsequently polymerizing a polar vinyl monomer in the presence of the treated polyolefin.

---

The present invention relates to a novel process for block copolymerization and more particularly to the block copolymerization of polar monomers on preformed olefin polymers.

The polymerization of α-olefins such as ethylene and propylene to result in high molecular weight polymers suitable in a wide variety of plastics application is known in the art.

Although it had originally only been possible to polymerize ethylene to the molecular weights necessary in plastics applications, more recently novel catalyst systems were discovered which not only permitted the polymerization of ethylene to the desired high molecular weights, but furthermore allowed the polymerization of propylene to a highly crystalline polymer of utility in the formation of molded articles, films, and fiber. In addition, these catalyst systems permitted the copolymerization of ethylene with propylene as well as the homo- and co-polymerization of α-olefins having a higher number of carbon atoms such as butene-1, 4-methylpentene-1, 2-ethylhexene-1, butadiene, isoprene, and the like. These recently discovered catalyst systems, which have also been termed "Ziegler catalysts," are metal complexes obtained by the reaction of a transition metal salt and preferably a transition metal halide with an organo-metallic component containing a hydrocarbyl radical bonded to metal and preferably an aluminum-containing organo-metallic compound. The hydrocarbon polymers obtained by the polymerization with these organo-metallic complexes are, however, frequently deficient in certain property areas insofar as some of their applications are concerned. Thus, films prepared from such hydrocarbon polymers often do not exhibit the desired degree of transparency and clarity; fibers prepared with such hydrocarbon polymers are not only difficult to dye but can be employed only with a very limited number of dyes; and molded articles prepared from hydrocarbon polymers of this type are frequently deficient in their rigidity or impact resistance. To overcome some or all of these deficiencies in these hydrocarbon polymers, it has been proposed to copolymerize such with polar comonomers in order to modify the properties of the hydrocarbon polymer in the manner desired. It has, however, been established that the polar nature of such modifying monomers deleteriously affects the catalytic activity of the described metal complex catalysts such that the direct copolymerization of olefins and polar comonomers proceeds only at extremely low rates, which makes this approach economically unattractive. Additionally, desirable properties such as crystallinity can be adversely affected. The block copolymerization of polar monomers on preformed α-olefin polymers has shown a greater degree of promise from a standpoint of ability to copolymerize such and from the standpoint of resulting in block copolymers which exhibit the desired property improvement. Methods heretofore developed for the block copolymerization of α-olefin polymers prepared with organo-metallic catalysts and polar comonomers have, however, been subject to a number of disadvantages such as requiring the use of secondary catalysts which adversely affect the structure of the hydrocarbon polymer modified, e.g. irradiation; being expensive and difficult to scale up; and being suitable for only a limited number of polar comonomers or capable of incorporating only minor amounts of polar comonomers.

It is therefore an object of the present invention to provide a novel block copolymerization process.

It is another object of the present invention to provide a block copolymerization process in which polymeric chains of polar comonomers are attached to hydrocarbon polymers prepared by polymerization of α-olefins with organo-metallic catalysts.

Still another object of the present invention is to provide an economical process for the block copolymerization of polar comonomers onto olefin polymers which permits substantial concentrations of the comonomer to be attached to the olefin polymer, and is applicable to a wide variety of polar comonomers.

Other objects will become apparent from the following description and claims.

The block copolymerization of the present invention comprises the steps of:

(a) forming a mixture of an organo-metallic catalyst and an α-olefin polymer free of α-olefin monomer;
(b) treating said mixture with a nitrogen compound having the general formula

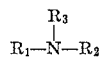

wherein $R_1$, $R_2$, and $R_3$ are hydrogen, aliphatic hydrocarbon radicals of 1–6 carbon atoms and wherein two of said aliphatic radicals can be combined to form a cyclic radical and oxygen; and
(c) removing from the resulting reaction mixture the nitrogen compound and oxygen and adding a polar comonomer to the reaction mixture to cause the formation of a block copolymer of said α-olefin polymer and said polar comonomer.

The term "α-olefin" as employed herein is meant to define an aliphatic hydrocarbon monomer containing at least one terminal ethylenically unsaturated double bond and having from 2–12 carbon atoms. Examples of such monomers are ethylene, propylene, butene-1, pentene-1, hexene-1, dodecene-1, butadiene, isoprene, 1,5-hexadiene, 4 - methylpentene-1, 3-methylbutene-1, 2-ethylhexene-1, vinyl cyclohexane, and mixtures of two or more of any of the aforesaid olefins. The term "α-olefin polymer" therefore includes homopolymers and interpolymers of two or more olefins which can be obtained by random copolymerization or by block copolymerization. The term "polar comonomer" is meant to define an ethylenically unsaturated compound having the general formula

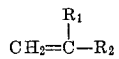

in which at least one of said $R_1$ and $R_2$ substituents contains an element other than hydrogen or carbon such as nitrogen, oxygen, sulphur, or phosphorus, or contains an aromatic ring. The preferred polar comonomers are those in which $R_1$ is hydrogen or a lower alkyl radical such as methyl, and $R_2$ is an alkoxy radical, a nitrile radical, a carboxyl radical, a carboxy ester radical, an acyl radical, a phosphonate radical, a sulfonate radical, keto radical, or a phenyl radical. Particular, and preferred, polar comonomers will be more specifically described hereinbelow.

The term "organo-metallic catalyst" as employed herein is meant to define a polymerization catalyst obtained by the interaction of a transition metal salt, preferably halide, with an organo-metallic compound containing a hydrocarbon radical bonded to a metal which, preferably, is aluminum. The preferred transition metal salts are titanium tetrahalide, titanium trihalide, vanadium tetrahalide, and vanadium trihalide, although other transition metal halides in Groups IV–B, V–B, VI–B, and VIII of the Periodic Table of Elements can also be employed. Suitable organo-metallic compounds reacted with the transition metal salt to form the organo-metallic catalysts include dialkyl aluminum halides, trialkyl aluminums, alkyl aluminum dihalides, lithium aluminum tetraalkyls, dialkyl aluminum hydrides, tin tetraalkyls, alkyl magnesium halides, and dialkyl zincs. The preparation of the described organo-metallic catalysts and their use in the polymerization of the described α-olefins is well-known in the literature and thus requires no further description here. Typical methods for preparing polypropylene, for example, are disclosed in Belgian Patent 538,782 and U.S. Patents 2,949,447, 2,911,384 and 2,825,721.

The present invention is based on the discovery that the polymerization environment in which α-olefins are polymerized with organo-metallic catalysts can be altered to make such suitable for the block copolymerization of significant concentrations of polar monomers onto preformed olefin polymer chains. As explained above, the environment resulting from polymerizing an α-olefin with an organo-metallic catalyst is not attractive for the block copolymerization of polar monomers with the olefin polymer. By changing the environment, by the methods described, polar comonomers readily block copolymerize with the preformed olefin polymer to result in copolymers containing anywhere from 0.1 to about 25% by weight, based on the weight of total copolymer, of the polar comonomer. It is to be noted that, in altering the olefin polymer environment to make such suitable for the block copolymerization of polar comonomers, the ability of the systems to further polymerize α-olefin monomers is destroyed. Although the reaction mechanisms involved in the olefin polymerization and in the block copolymerization of the polar comonomer are not clearly understood, it is believed that the process of the present invention changes the polymerization environment from one in which the polymerization proceeds through a principally ionic mechanism to an environment in which the polymerization proceeds through principally a radical mechanism. Since most polar comonomers are more readily polymerized by a radical mechanism, the advantages of the process of the present invention will be apparent to those skilled in the art in permitting a wider scope and higher concentration of polar comonomers to be block copolymerized with the olefin polymer than has heretofore been possible.

In the first step of the process of the present invention, a mixture of the organo-metallic catalyst and an α-olefin polymer free of α-olefin monomer is formed. Preferably, this mixture is formed by reacting the desired monomer with the organo-metallic catalyst until a desired amount of the monomer has been polymerized removing any unreacted monomer from the system such as by distillation or purging, and then employing the resulting reaction mixture of solid polymer and catalyst directly in the second step of the process of the present invention. It is, however, possible to take a preformed polyolefin material and add thereto the organo-metallic catalyst in catalytic concentrations normally employed for the polymerization (i.e. 0.001 to 10% based on the weight of polymer) and thereafter subjecting this mixture to the next step of the process of the present invention. The mixture of α-olefin polymer and organo-metallic catalyst when formed in either of the ways described can contain inert hydrocarbon solvents normally employed in the polymerization process, although polymerizable α-olefins must be removed from the system before the second step of the block copolymerization of the present invention is attempted. In such systems, the solid polymer can be in the form of a slurry or a dispersion. The effect of solvent on the block copolymerization of the polar monomer will be described in greater detail hereinbelow. In general, it is preferred to obtain a mixture of organo-metallic catalyst and α-olefin polymer free of olefin monomer which does not contain a solvent. Methods whereby α-olefins are polymerized with the organo-metallic catalyst which do not involve the use of inert solvents such as, for example, in the liquid bulk polymerization of α-olefins are therefore preferred methods of obtaining the described mixture. Such polymerization techniques, furthermore, allow the removal of unreacted monomer, necessary to pervent interference of the olefin monomer in the second step of the process of the present invention, more readily than other polymerization methods in which solvents are present. As indicated above, a wide variety of α-olefin polymers can be suitably block copolymerized by the process of the present invention. Particularly preferred olefin polymers employed in the process of the present invention are polypropylene, polyethylene, and random and block copolymers of ethylene and propylene. In view of the wide commercial acceptance of these preferred polyolefins it is therefore particularly desirable to be able to alter the properties of these polymers by block copolymerization with polar comonomers. Particularly preferred organo-metallic catalysts employed in the polymerization of ethylene, propylene, and mixtures of ethylene and propylene are the catalysts obtained by the reaction of titanium tetrachloride, titanium trichloride, and particularly aluminum-containing titanium trichloride, with aluminum trialkyls and aluminum dialkyl halides in which the alkyl radicals contain from 1–4 carbon atoms and in which the halogen is preferably chlorine.

In the second step of the block copolymerization of the present invention, the environment is changed from one principally suited to the polymerization of α-olefin monomers to one which is principally suited to the polymerization of polar comonomers. This is accomplished by treating the described mixture with a nitrogen compound which, as will be apparent from the above-indicated formula, can be ammonia, a primary amine, a secondary amine, or a tertiary amine. The secondary and tertiary amines can be cyclic in nature such as piperidine, for example, in addition to including secondary and tertiary amines in which the substituents on the nitrogen are alkyl radicals, and preferably alkyl radicals having from 1–4 carbon atoms. The more preferred nitrogen compounds employed in the process of the present invention are, however, ammonia and primary, secondary, and tertiary amines which are gaseous at the treating temperatures. The most effective nitrogen compound employed is ammonia. The treating steps can be carried out by employing a mixture of the nitrogen compound and oxygen, although it is preferred to first treat the mixture with the nitrogen compound and thereafter, on purging of the nitrogen compound, to treat the mixture with oxygen. Both the nitrogen compound and the oxygen are employed in excess by which is meant more than is capable of being absorbed or retained by the mixture treated. On treatment with excess of both of these compounds, the reaction mixture is purged and then is ready for block copolymerization with the polar comonomer. The temperature at which the treatment is carried out is not critical and can be varied widely. Generally, the temperature should not exceed the melting point of the polymer so that the polymer exists in the solid phase during the treatment with the activating gases. Thus, the temperature will vary from room temperature to 250° F. and preferably treatment is carried out at 60–150° F. The gaseous treatment of the polymer is generally conducted at pressures of 0.1 to 100 p.s.i.g., although such is not critical. Solvent can be present during the treating step, although it is generally preferred to treat the solid polymer directly with the gaseous nitrogen compound and subsequently with oxygen. Prior to the treatment with the nitrogen compound and subsequent to the treatment with the nitrogen compound and oxygen, it is preferred to purge the reaction mixture with an inert gas such as nitrogen, helium, or argon. The treatment of the reaction mixture with either ammonia or oxygen alone does not significantly increase the reactivity towards polar monomers nor does the reactivity increase substantially when the solid polymer is first treated with oxygen and then with a nitrogen compound.

The third step in the block copolymerization according to the present invention comprises addition of the polar comonomer to the treated solid polymer reaction mixture. Any polar comonomer, i.e. a compound containing terminal ethylenic unsaturation and containing a substituent imparting a significant dipole moment, such as greater than 1 Debye, to the molecule by having incorporated in such one or more hetero atoms such as oxygen, nitrogen, sulphur, phosphorus, or halogen, or an aromatic ring can be employed. Particular classes of suitable polar comonomers have been set forth hereinabove. Particularly preferred monomers are the acrylic monomers such as acrylonitrile, acrylic acid, methacrylic acid, ethacrylic acid, methyl acrylate, methyl methacrylate, ethyl acrylate, ethyl methacrylate, butyl acrylate, butyl methacrylate, 2-ethylhexyl acrylate, 2-ethylhexyl methacrylate, isobutylethyl acrylate, hydroxyethyl methacrylate, dimethylaminoethyl methacrylate, glycidyl methacrylate, cyclohexyl methacrylate, amyl acrylate, and tertiary-butyl methacrylate. Other suitable polar comonomers include styrene, halogen-substituted styrenes, vinyl acetate, n-vinyl pyrrolidone, 2-methyl - 5 - vinyl pyridine, 4-vinyl pyridine, 3-vinyl pyridine, 2-ethyl - 5 - vinyl pyridine, 4-isopropyl-6-vinyl pyridine, 2,3-dimethyl 5 vinyl pyridine, isopropyl-6-vinyl pyridine, 2,3-dimethyl - 5 - vinyl pyridine, 3,6-diethyl - 4 - vinyl pyridine, isobutyl vinyl ether, dimethylaminoethyl vinyl ether, bis ($\beta$-chloroethyl)-vinyl phosphonate, methyl vinyl ketone, vinyl chloride, vinyl propionate, and vinyl sulfone. More than one monomer can be employed in the block copolymerization in the form of a mixture of two or more polar comonomers. In view of their better compatibility with the hydrocarbon polymer, polar comonomers containing hydrocarbyl radicals of 3 or more carbon atoms such as butyl methacrylate, 2-ethylhexyl acrylate, and the like, are preferred monomers. From the standpoint of further reactivity of the resulting block copolymer, however, the acid compounds such as acrylic acid, methacrylic acid and ethacrylic acid are preferred.

The block copolymerization is conducted by adding the monomer in liquid form to the activated reaction mixture above-described. Since the polymerization is generally exothermic in nature, it is frequently not necessary to heat the reaction mixture in order to achieve block copolymerization. In general, the reaction mixture is maintained at a temperature between 60–250° F. and preferably between 90–150° F. As established by subsequent extraction procedures, the polymerization occurring is principally block copolymerization onto the preformed polymer chain, with a variable minor amount of independent homopolymerization of the comonomer occurring. The degree of block polymerization against homopolymerization will differ with the monomer employed.

Although, in general, block copolymerization can be obtained by injecting only the liquid polar comonomer into a stirred reaction vessel containing the activated olefin polymer mixture, it is preferred to employ an inert solvent in combination with the polar comonomer for particular polar comonomers. Thus, with certain polar comonomers the addition of a solvent suppresses the homopolymerization of the polar comonomer and results in a greater extent of the polar comonomer being incorporated in the block copolymer. This is particularly true for the highly active polar comonomers such as acrylic acid, methacrylic acid, and the $C_1$–$C_3$ alkyl esters of these acids. Using solvent in combination with other polar comonomers, however, can result in a decrease in the amount of the polar comonomer copolymerized with the olefin polymer. This is particularly true of the more sluggishly reacting monomers such as vinyl chloride and vinyl acetate. The extent or degree of block copolymerization depends on the reaction conditions employed and will vary from monomer to monomer. However, in general, a larger quantity of polar comonomer will result in a higher degree of block copolymerization as will a lower polymerization temperature. In general, an excess of between 10–100% of the polar comonomer content desired in the block copolymer is employed. Preferably, the excess is between 20–40%. Reaction times will vary, but, in general, the reaction is allowed to go to completion as measured by temperature changes. Solvents which are in particular employed in combination with the polar comonomer are solvents capable of dissolving the polar comonomer but otherwise remaining inert in the system. Particularly suitable solvents are hydrocarbon solvents such as hexane, pentane, cyclohexane, heptane, benzene, xylene, and the like.

The product obtained from the block copolymerization is then purified by removing unreacted polar monomer and by deactivating the precipitating catalyst residues by techniques heretofore developed in the purification of olefin polymers prepared by polymerization with the described organo-metallic catalysts. Such methods can involve the washing of the solid polymer product with water, dilute hydrochloric acid, alcohol, or any combination thereof, or by employing alcohol solutions containing chelating agents capable of chelating with the metallic components of the catalyst as has been described in the literature. If any significant amounts of polar comonomer homopolymer are formed in the block copolymerization, these can be removed by selective extraction with slightly polar-organic solvents such as esters, ketones, and ethers. The use of solvent during the block copolymerization can enhance the homogeneity of the block copolymer obtained. Further homogenization of the block copolymer can also be obtained by melt-blending the polymer after its separation from unreacted monomer and after the removal of catalyst residues. Such melt-blending can be carried out in an extruder or many of the other devices heretofore developed for the melt-bending of thermoplastic resins.

The effect of the polymerized polar comonomer on the properties of the olefin polymer will, of course, depend on the particular olefin polymer, the particular polar comonomer, and the extent of the block copolymerization. However, by modifying the olefin polymer in accordance with the present invention, such properties as tensile strength and stiffness can be increased, low temperature brittleness improved, clarity of films prepared from such olefin polymers improved over the unmodified olefin polymers, and the dyeability of fibers produced from the block copolymers obtained by the process of the present invention improved as compared to the unmodified olefin polymers. Included within the scope of improved dyeability of the resulting block copolymer is also the improved printability of films prepared from such block copolymers. The use of polar comonomers containing reactive substituents such as, for example, acrylic acid or methacrylic acid, allows a wide variety of post-polymerization reactions to be performed on the block copolymer, either prior to or subsequent to shaping of the polymer into an article such as a film or a fiber. Post-polymerization reactions include reactions with metal compounds to form salts of the acids incorporated into the block copolymer. Such modification can result in films or molded articles of greater clarity and higher toughness. In other applications, the reactive comonomer sites on the block copolymer can be reacted with reactive dyestuffs or anti-static agents to permanently bond such to the polymer chain.

The invention invention is further illustrated by the following examples, in which all parts and percentages are by weight unless otherwise indicated.

Example 1

To a heated one liter steel reactor is added 0.65 g. of aluminum chloride-titanium chloride, $AlCl_3 \cdot 3TiCl_3$, followed by 8.4 cc. of one molar diethyl aluminum monochloride. This corresponds to a molar ratio of 2Al/Ti. The reaction vessel is pressured to 25 p.s.i.g. with hydrogen and 400 ml. of liquid propylene monomer is added. The stirred reaction mixture is warmed from 75° F. to 140° F. where the temperature is maintained for 40 minutes. The reactor is depressurized and purged with argon gas for 15 minutes to remove unreacted propylene monomer. The system is closed to the atmosphere and ammonia gas is added to the polypropylene-containing reaction mixture until a pressure of 3 p.s.i.g. is built up. After stirring for five minutes, the ammonia is vented and its traces purged by an argon stream. The system is closed and oxygen pressured into the reactor to a pressure of 10 p.s.i.g. After five minutes additional stirring, the oxygen is vented and the reactor purged briefly with argon gas. To the treated polypropylene is added 60 ml. of distilled acrylonitrile at 95° F. with agitation. An exothermic reaction ensues, which raises the temperature to 140° F. where it remains without additional heat for 50 minutes. The reactor is then cooled and disassembled. The resulting polypropylene/polyacrylonitrile block copolymer is washed twice with equal parts of a hot isopropanol-heptane mixture. The dried block copolymer weights 160 grams, has a density of .920 g./cc. and a melt index at 230° C. of 0.44 (ASTM–D–1238–62T). Infrared analysis shows the block copolymer to contain 6.5% of polymerized acrylonitrile. Solution of the polymer in boiling xylene, filtration and reprecipitation yields product containing approximately the same acrylonitrile content. This indicates block copolymerization rather than homopolymerization of the nitrile had occurred.

Example 2

Polypropylene activated by treatment with ammonia and oxygen is prepared as described in Example 1 except that in the formation of the polypropylene a hydrogen pressure of 12–16 p.s.i.g. is employed. To the activated polypropylene is added 50 ml. of dimethylaminoethyl methacrylate at about 95° F. with agitation. An exothermic reaction ensues which raises the temperature to 141° F. where it remains without additional heat for 40 minutes. The reactor is then cooled and disassembled. The resulting polypropylene/poly (dimethylaminoethyl methacrylate) is washed twice with equal parts of a hot isopropanol-heptane mixture. The dried block copolymer weighs 230 g., has a density of 0.933 g./cc. and a melt index at 230° C. of 5.0. Infrared analysis shows the block copolymer to contain 9.0% of polymerized dimethylaminoethyl methacrylate.

Example 3

Polypropylene activated with ammonia and oxygen is prepared as described in Example 2. To the activated polypropylene is added 60 cc. of methyl methacrylate at about 95° F. with agitation. An exothermic reaction ensues which raises the temperature to 140° F. where it remains for about an hour. The resulting polypropylene/poly (methyl methacrylate) block copolymer is washed twice with equal parts of a hot isopropanol-heptane mixture. The dried block copolymer weighs 235 g., has a density of 0.948 g./cc. and a melt index at 230° C. of 0.9. Infrared analysis shows the block copolymer to contain 8% of polymerized methyl methacrylate.

Example 4

Polypropylene activated with ammonia and oxygen is prepared as described in Example 2. To the activated polypropylene is added 50 cc. of isobutyl methacrylate at about 95° F. with agitation. An exothermic reaction ensues which raises the temperature to 150° F. where it remains for about an hour. The resulting polypropylene/poly (isobutyl methacrylate) block copolymer is washed twice with equal parts of a hot isopropanol-heptane mixture. The dried block copolymer weighs 173 g. has a density of 0.930 g./cc. and a melt index at 230° C. of 0.80. Infrared analysis shows the block copolymer to contain 15% of polymerized isobutyl methacrylate.

Example 5

Polypropylene activated with ammonia and oxygen is prepared as described in Example 2. To the activated polypropylene is added 40 cc. of styrene dissolved in 80 cc. of cyclohexane at about 95° F. with agitation. The reaction mixture is maintained at 180° F. for about an hour. The resulting polypropylene/polystrene block copolymer is washed twice with equal parts of a hot isopropanol-heptane mixture. The dried block copolymer weighs 256 g., has a density of 0.908 g./cc. and a melt index of 3.0 at 230° C. Infrared analysis shows the block copolymer to contain 2.4% of polymerized styrene.

Example 6

The procedure of Example 5 is repeated, except that instead of the styrene solution, 50 cc. of styrene is employed. A block copolymer having a density of 0.927 g./cc., a melt index of 4.5 at 230° C., and containing 15% of polymerized styrene as measured by infrared analysis, is obtained. Extraction of a portion of the block copolymer with cold benzene does not affect the styrene content.

Example 7

Polypropylene activated with ammonia and oxygen is prepared as described in Example 2. To the activated polypropylene is added 60 cc. of ethyl acrylate at 95° F. with agitation. An exothermic reaction ensues which raises the temperature to 135° F. where it remains for one hour. The resulting polypropylene/poly (ethyl acrylate) block copolymer is washed twice with equal parts of a hot isopropanol-heptane mixture. The dried block copolymer weighs 215 g., has a density of 0.931 g./cc. and a melt index of 0.33 at 230° C. Infrared analysis shows the block copolymer to contain 11% of polymerized ethyl acrylate. After extraction of a portion of the product with ethyl acetate, the insoluble polymer remaining contains 9% ethyl acrylate.

Example 8

Polypropylene activated with ammonia and oxygen is prepared as described in Example 2. To the activated polypropylene is added 50 cc. of butyl acrylate in 100 cc. of n-pentane at about 95° F. with agitation. An exothermic reaction ensues which raises the temperature to 140° F. where it remains for about one hour. The resulting polypropylene/poly (butyl acrylate) block copolymer is washed twice with equal parts of a hot isopropanol-heptane mixture. The dried block copolymer weighs 185 g., has a density of 0.914 g./cc. and a melt index of 3.7 at 230° C. Infrared analysis shows the block copolymer to contain 6% of polymerized butyl acrylate.

Example 9

Polypropylene activated with ammonia and oxygen is prepared as described in Example 2. To the activated polypropylene is added 50 cc. of 2-ethylhexyl acrylate in 100 cc. of n-pentane at 95° F. with agitation. An exothermic reaction ensues which raises the temperature to 140°

F. where it remains for about one hour. The resulting polypropylene/poly (2-ethylhexyl acrylate) block copolymer is washed twice with equal parts of a hot isopropanol-heptane mixture. The dried block copolymer weighs 152 g., has a density of 0.908 g./cc. and a melt index of 1.0 at 230° C. Infrared analysis shows the block copolymer to contain 3.9% of polymerized 2-ethylhexyl acrylate.

Example 10

Polypropylene activated with ammonia and oxygen is prepared as described in Example 2. To the activated polypropylene is added 50 cc. of methacrylic acid in 25 cc. of cyclohexane at 100° F. with agitation. The temperature is raised to 170° F. and kept there for about 35 minutes. The resulting polypropylene/poly (methacrylic acid) block copolymer is washed twice with equal parts of a hot isopropanol-heptane mixture. The dried block copolymer weighs 237 g., has a density of 0.933 g./cc. and a melt index of 1.6 at 230° C. Infrared analysis shows the block copolymer to contain 5.0% of polymerized methacrylic acid.

Example 11

Polypropylene activated with ammonia and oxygen is prepared as described in Example 2. To the activated polypropylene is added 30 cc. of acrylic acid in 30 cc. of cyclohexane at 100° F. with agitation. An exothermic reaction ensues which raises the temperature to 160° F. where it is maintained for 45 mintues. The resulting polypropylene/poly (acrylic acid) block copolymer is washed twice with equal parts of a hot isopropanol-heptane mixture. The dried block copolymer weighs 205 g., has a density of 0.923 g./cc. and a melt index of 2.7 at 230° C. Infrared analysis shows the block copolymer to contain 1% of polymerized acrylic acid.

Example 12

The procedure of Example 2 is repeated and a polypropylene produced. To the resulting reaction mixture is then added 12 g. of ethylene at a rate of 2 grams per minute and polymerization is continued for an additional ten minutes. The reaction mixture is then vented and treated with ammonia and oxygen as in Example 1. To the activated polypropylene/polyethylene block copolymer is then added 30 cc. of acrylic acid in 50 cc. of cyclohexane at 95° F. with agitation. The temperature is raised to 140–150° F. where it is maintained for about one hour. The resulting polypropylene/polyethylene/poly (acrylic acid) block terpolymer is washed twice with equal parts of a hot isopropanol-heptane mixture. The dried block copolymer weighs 225 g., has a density of 0.933 g./cc. and a melt index of 0.2 at 230° C. Infrared analysis shows the block copolymer to contain 1.3% of polymerized acrylic acid.

Example 13

Polypropylene activated with ammonia and oxygen is prepared as described in Example 2. To the activated polypropylene is added 50 cc. of vinyl acetate at 97° F. with agitation. An exothermic reaction ensues which raises the temperature to 128° F. where it remains for about one hour. The resulting polypropylene/poly(vinyl acetate) block copolymer is washed twice with equal parts of a hot isopropanol-heptane mixture. The dried block copolymer weighs 230 g., has a density of 0.921 g./cc. and a melt index of 0.49 at 230° C. Infrared analysis shows the block copolymer to contain 3.5% of polymerized vinyl acetate.

Example 14

Polypropylene activated with ammonia and oxygen is prepared as described in Example 2. To the activated polypropylene is added 40 cc. of acrylonitrile and 25 cc. of methyl methacrylate at a temperature of 95° F. with agitation. An exothermic reaction ensues which raises the temperature to 130–140° F. where it remains for about one hour. The resulting polypropylene/polymerized acrylonitrile-methyl methacrylate block terpolymer is washed twice with equal parts of a hot isopropanol-heptane mixture. The dried block terpolymer weighs 194 g., has a density of 0.925 g./cc. and a melt index of 1.5 at 230° C. Infrared analysis shows the block terpolymer to contain 8.4% of polymerized acrylonitrile and 4.7% of polymerized methyl methacrylate.

Example 15

Polypropylene activated with ammonia and oxygen is prepared as described in Example 2. To the activated polypropylene is added 10 cc. of styrene and 20 cc. of methyl methacrylate at 95° F. with agitation. The reaction temperature is raised to 160° F. where it is maintained for about one hour. The resulting polypropylene/polymerized styrene-methyl methacrylate block terpolymer is washed twice with equal parts of a hot isopropanol heptane mixture. The dried block terpolymer weighs 171 g., has a density of 0.933 g./cc. and a melt index of 1.5 at 230° C. Infrared analysis shows the block terpolymer to contain 4.7% of polymerized styrene and 4.9% of polymerized methyl methacrylate. Extraction of the product with hot ethyl acetate did not reduce the content of styrene or methyl methacrylate in the terpolymer.

Example 16

Polypropylene activated with ammonia and oxygen is prepared as described in Example 2. To the activated polypropylene is added 50 cc. of acrylonitrile and 35 cc. of styrene at 95° F. with agitation. The temperature is raised to 160° F. where it is maintained for about one hour. The resulting polypropylene/polymerized acrylonitrile-styrene block tempolymer is washed twice with equal parts of a hot isopropanol-heptane mixture. The dried block terpolymer weighs 215 g., has a density of 0.943 g./cc. and a melt index of 0 at 230° C. Infrared analysis shows the block terpolymer to contain 20% of polymerized acrylonitrile and 10% of polymerized styrene. Extraction of the product with hot benzene did not reduce the styrene or acrylonitrile content in the terpolymer.

Example 17

The procedure of Example 9 is repeated except that the polypropylene is treated with a mixture of ammonia and oxygen using 35 cc. of 2-ethylhexyl acrylate at a temperature of 160° F. the resulting block copolymer contains 4.4% of polymerized 2-ethylhexyl acrylate.

Example 18

To 100 g. of high molecular weight crystalline polypropylene powder is added 0.33 g. of $AlCl_3 \cdot TiCl_3$ and 4.2 g. of one molar diethyl aluminum monochloride (molar ratio of Al/Ti of 2) in sufficient pentane to form a slurry. The mixture is treated with hydrogen and the pentane is then evaporated. The resulting product is then treated with butyl acrylate substantially as set forth in Example 8. Infrared ananlysis of the resulting polypropylene/poly (butyl acrylate) copolymer shows it to contain 3% of polymerized butyl acrylate.

Example 19

Following substantially the procedure of Example 7, except that the polypropylene is treated with methylamine instead of ammonia, a polypropylene/poly (ethyl acrylate) block copolymer containing 2.2% of polymerized ethyl acrylate as measured by infrared analysis, is obtained.

Example 20

Following substantially the procedure of Example 8, except that the polypropylene is treated with trimethylamine instead of ammonia, a polypropylene/poly(butyl acrylate) block copolymer containing 2.4% of polymerized butyl acrylate as measured by infrared analysis, is obtained.

Example 21

Following the procedure of Example 8, except that 50 cc. of ethyl acrylate in 100 cc. of pentane is employed instead of the butyl acrylate, a polypropylene/poly (ethyl acrylate) block copolymer weighing 236 g., having a density of 0.918 g./cc. as melt index of 1.3 at 230° C. is obtained. Infrared analysis shows the block copolymer to contain 6% of polymerized ethyl acrylate.

The procedure is repeated except that the oxygen treatment is omitted. The yield of polymer is 240 g. the density .909 g./cc. and the melt index 1.7 at 230° C. Infrared analysis of the polymer shows a polymerized ethyl acrylate content of 0.5%.

This example demonstrates the significant increase in reactivity obtained by employing the combination of ammonia and oxygen as compared to ammonia alone.

Example 22

The procedure of Example 1 is repeated. The resulting polypropylene/polyacrylonitrile block copolymer, weighing 230 g., has a density of 0.923 g./cc. and a melt index of 0.7 at 230° C. Infrared analysis shows the block copolymer to contain 12.8% of polymerized acrylonitrile.

The procedure is repeated reversing the order in which the polypropylene is treated with the ammonia and oxygen. The resulting copolymer, weighing 178 g. has a density of 0.912 g./cc. and a melt index of 0.9 at 230° C. Infrared analysis shows the copolymer to contain 2.0% of acrylonitrile. The foregoing example shows the significance of the order of adding the treating agents.

Example 23

The procedure of Example 14 is repeated except that 30 cc. of acrylonitrile and 30 cc. of methyl methacrylate is employed and except that the polypropylene is treated solely with oxygen, the polymer showed no detectable acrylonitrile content and a polymerized methyl methacrylate content of 0.1%.

This example illustrates the criticality of using the nitrogen containing compound to obtain high contents of polymerized comonomer.

The foregoing examples have illustrated the block copolymerization of a wide variety of polar comonomers using different polyolefins and activators. As will be apparent from these examples, the foregoing procedures can similarly be employed with other polar comonomers, polyolefins and activators which are included in the scope of the present invention, although not specifically illustrated in the examples. Similarly, various modifications and alterations in the various process steps employed will be apparent to those skilled in the art and it is not intended to limit the process of the present invention to the specific embodiments set forth in the examples.

What is claimed is:
1. A process for block copolymerization, comprising:
 (a) forming a mixture of an organo-metallic catalyst and an α-olefin polymer free of α-olefin monomer,
 (b) treating said mixture with a nitrogen compound having the general formula

wherein $R_1$, $R_2$, and $R_3$ are hydrogen or aliphatic hydrocarbon radicals of 1–6 carbon atoms or wherein two of said hydrocarbon radicals can be combined to form cyclic radicals and oxygen,
 (c) removing from said reaction mixture said nitrogen compound and oxygen, adding a polar comonomer to the reaction mixture and continuing the reaction until a block copolymer of said α-olefin polymer and said polar comonomer is obtained.

2. The process of claim 1 wherein the nitrogen compound is ammonia.

3. The process of claim 1 wherein the treatment of the olefin polymer with oxygen is subsequent to the treatment with the nitrogen compound.

4. The process of claim 3 wherein the nitrogen compound is a methyl-substituted nitrogen compound.

5. The process of claim 1 wherein the olefin polymer is a propylene polymer.

6. The process of claim 5 wherein the olefin polymer is polypropylene.

7. The process of claim 5 wherein the olefin polymer is an ethylene propylene copolymer.

8. The process of claim 1 wherein the polar comonomer is an acrylic monomer.

9. The process of claim 8 wherein the acrylic comonomer is acrylic acid, methacrylic acid, or ethacrylic acid.

10. The process of claim 8 wherein the comonomer is an ester of acrylic acid, methacrylic acid, or ethacrylic acid and is dissolved in an inert organic solvent.

11. The process of claim 10 wherein the ester is an alkyl ester of 1–12 carbon atoms.

12. The process of claim 8 wherein the acrylic monomer is acrylonitrile.

13. The process of claim 1 wherein the polar comonomer is styrene.

14. The process of claim 1 wherein the polar comonomer is a vinyl ester.

15. The process of claim 1 wherein the olefin polymer is a propylene polymer, the nitrogen compound is ammonia, and the polar comonomer is an acrylic monomer.

16. The process of claim 1 wherein the organo-metallic catalyst is obtained by reaction of a titanium halide with an organo-metallic aluminum compound.

References Cited
UNITED STATES PATENTS

| | | | |
|---|---|---|---|
| 2,987,501 | 6/1961 | Rieke et al. | 260—877 |
| 3,073,667 | 1/1963 | Bonvinci et al. | 260—878 |
| 3,141,862 | 7/1964 | Kirshenbaum et al. | 260—878 |
| 3,170,004 | 2/1965 | Farago | 260—878 |
| 3,293,326 | 12/1966 | Jezl | 260—878 |
| 3,308,108 | 3/1967 | Feldhoff et al. | 260—878 |
| 3,342,900 | 9/1967 | Marans | 260—877 |
| 3,399,249 | 8/1968 | Hostetler | 260—878 |

MURRAY TILLMAN, Primary Examiner

J. T. GOOLKASIAN, Assistant Examiner

U.S. Cl. X.R.

260—878